Patented July 14, 1936

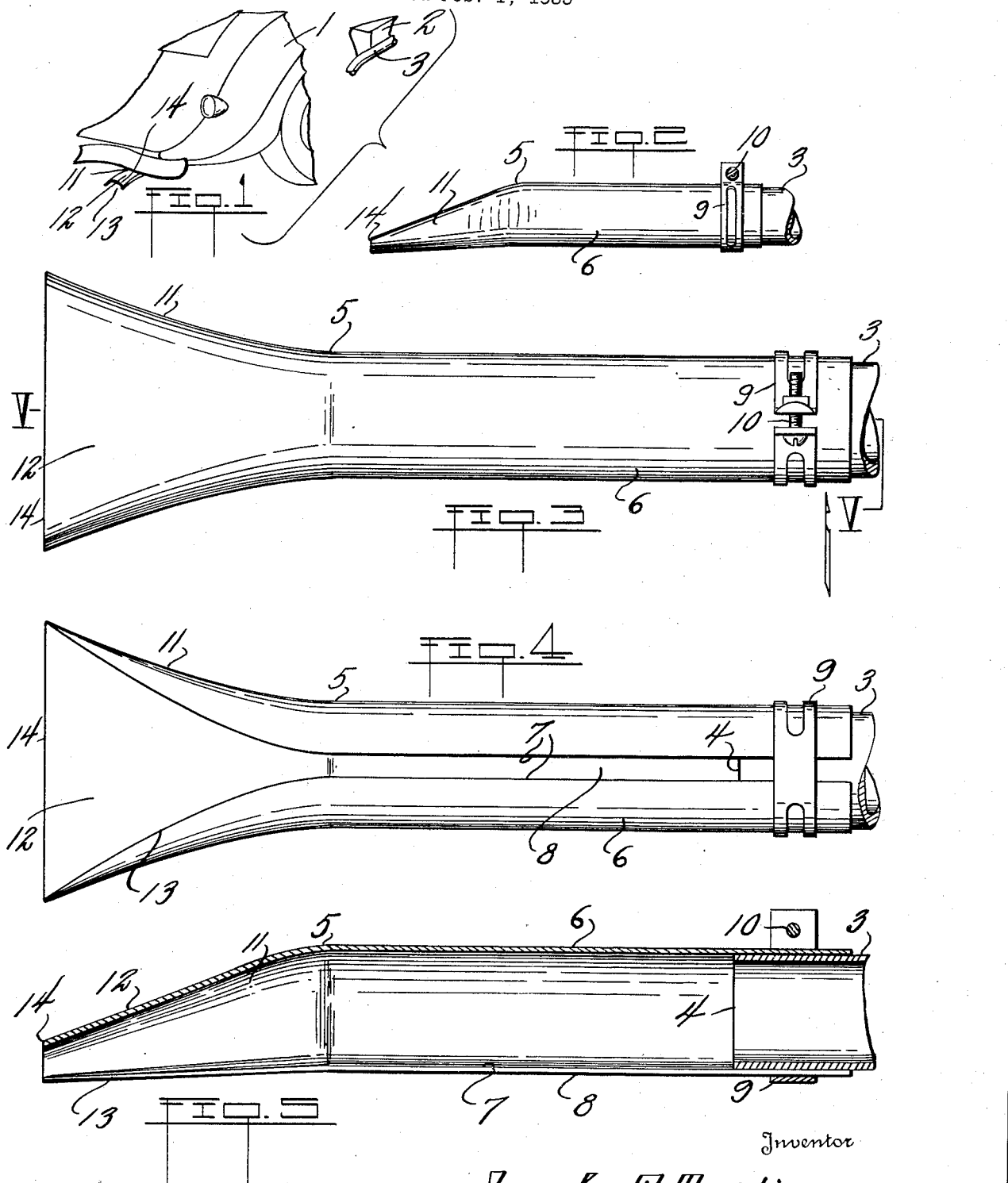

2,047,378

UNITED STATES PATENT OFFICE 2,047,378

MOTOR VEHICLE EXHAUST PIPE EXTENSION

Jacob F. Martin, Bellevue, Ohio, assignor to The Bellevue Manufacturing Company, Bellevue, Ohio, a corporation of Ohio Application February 1, 1935, Serial No. 4,431

1 Claim. (Cl. 181—72)

This invention relates to exhaust pipes for engine driven motor vehicles.

This invention has utility when incorporated with the exhaust pipe of an engine in a motor driven vehicle to direct the discharge therefrom without increasing the back pressure.

Referring to the drawing:

Fig. 1 is a fragmentary perspective view of a motor vehicle having the invention herein incorporated with the exhaust;

Fig. 2 is a side elevation of the exhaust terminus of Fig. 1;

Fig. 3 is a plan view of the device of Fig. 2;

Fig. 4 is a bottom plan view of the device of Fig. 2; and

Fig. 5 is a view on the line V—V, Fig. 3, looking in the direction of the arrow.

The invention herein relates to extensions for motor vehicle exhaust pipes whereby the discharge is carried beyond the normal extent of said pipe, preventing discoloring of the motor vehicle adjacent the discharge without increasing the back pressure to the engine. The invention may be incorporated directly with an exhaust or embodied in an accessory readily attached to a tail pipe with one size serving to accommodate the various size outlets in use on different types and styles of motor vehicles.

Motor vehicle 1 is propelled by engine 2 having exhaust pipe 3 therefrom terminating in outlet 4. It is normal practice among motor vehicle manufacturers to terminate the tail pipe so the outlet is below the body of the motor vehicle 1. It has been found that as so positioned fumes from the outlet discolor and destroy the finish of the vehicle adjacent the discharge. Furthermore, the fumes sometimes seep into the car interior. By the invention herein disclosed, the exhaust is directed downwardly and beyond the extent of the vehicle body.

Member 5 has portion 6 of approximately tubular form but having the adjacent edges 7 thereof spaced to provide longitudinal space 8 therebetween. This construction not only provides an outlet therethrough directly from the outlet 4 confining the escape of the exhaust downwardly but also allows the tube portion to be spread to engage a wide range of tail pipe sizes so that one size of accessory can be readily attached to any tail pipe now employed within the normal limits. The natural spring to the tubular portion allows the portion 6 to firmly engage the terminus of the tail pipe 3, and this mounting may be augmented by clamp 9 as a split ring adjustable by means of bolt 10 to further lock the extension in position.

The member 5 is provided with flare terminus 11 as a continuation of the tubular portion 6 forming a downwardly directed shield portion 12 with open bottom 13. Terminus 14 of the flare portion 11 is in a plane parallel to the plane passing through the lower portion of the exhaust outlet 4 and slightly thereabove, so that there may be a straight backward flow of a portion of the gases throughout the accessory to discharge.

By providing the continuous longitudinal opening on the bottom of the extension, there is an immediate release of pressure at the outlet 4, yet the major portion of the exhaust is carried some distance and all confined or directed against rising to a point beyond the extent of the vehicle. This immediate pressure relief prevents any increase in back pressure of the exhaust pipe which normally happens when the length of the pipe is increased.

The device is one of simple construction formed from a single casting or a single sheet metal piece and may be plated to improve appearance.

The extension is so constructed that it is approximately a straight line continuation of the normal exhaust, preventing any contact with the earth even when the vehicle is backing down a steep incline such as a driveway. The major discharge is approximately in a line with the normal outlet, yet directed entirely beyond the rearmost portion of the vehicle including any bumper or spare tire construction.

What is claimed and it is desired to secure by United States Letters Patent is:

An exhaust pipe extension comprising a tubular sleeve portion merging into a flared terminus portion, said sleeve portion being split to provide in the bottom thereof a slot-like opening connecting with a V-shaped opening in the bottom of said terminus portion, both of said openings being in substantially the same plane, the terminus portion having a flattened upper wall which slopes downwardly and rearwardly and terminates approximately in the plane of the openings, the side walls of both the sleeve and terminus portions extending downwardly to said plane for rigidity against lateral flexing while effectively confining and directing all discharge downwardly from the extension, and adjustable means adapted to clamp the tubular sleeve portion in embracing position about an exhaust pipe terminal.

JACOB F. MARTIN.